July 26, 1960　　　　　C. E. FOSTER　　　　　2,946,598
TRACTOR WITH FENDER AND CAB DEFINING TANKS
Filed Oct. 1, 1958　　　　　　　　　　　　　2 Sheets-Sheet 1
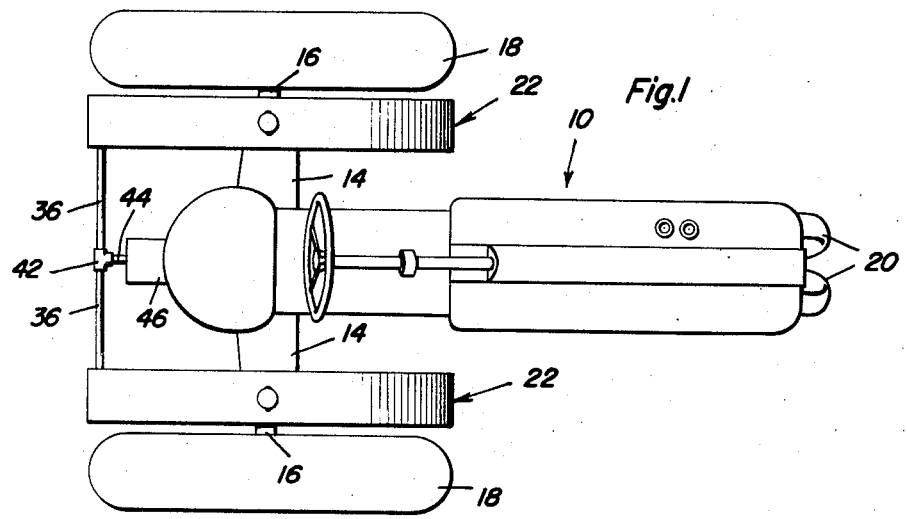
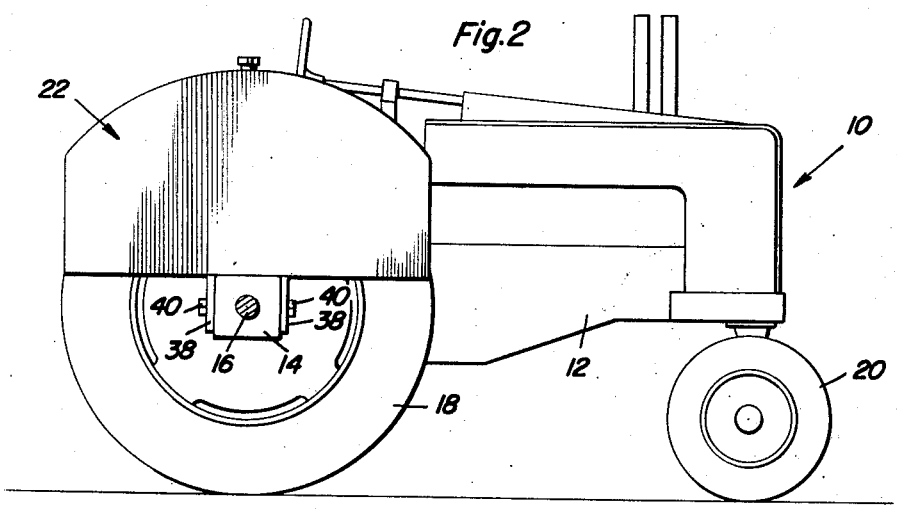
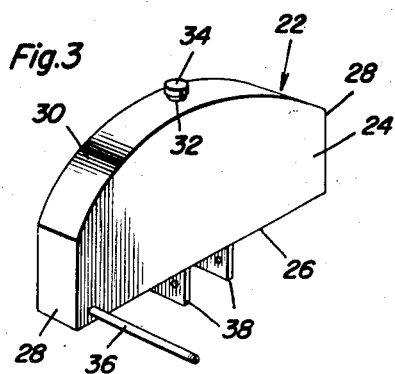
Charlie E. Foster
INVENTOR.

July 26, 1960 C. E. FOSTER 2,946,598
TRACTOR WITH FENDER AND CAB DEFINING TANKS
Filed Oct. 1, 1958 2 Sheets-Sheet 2
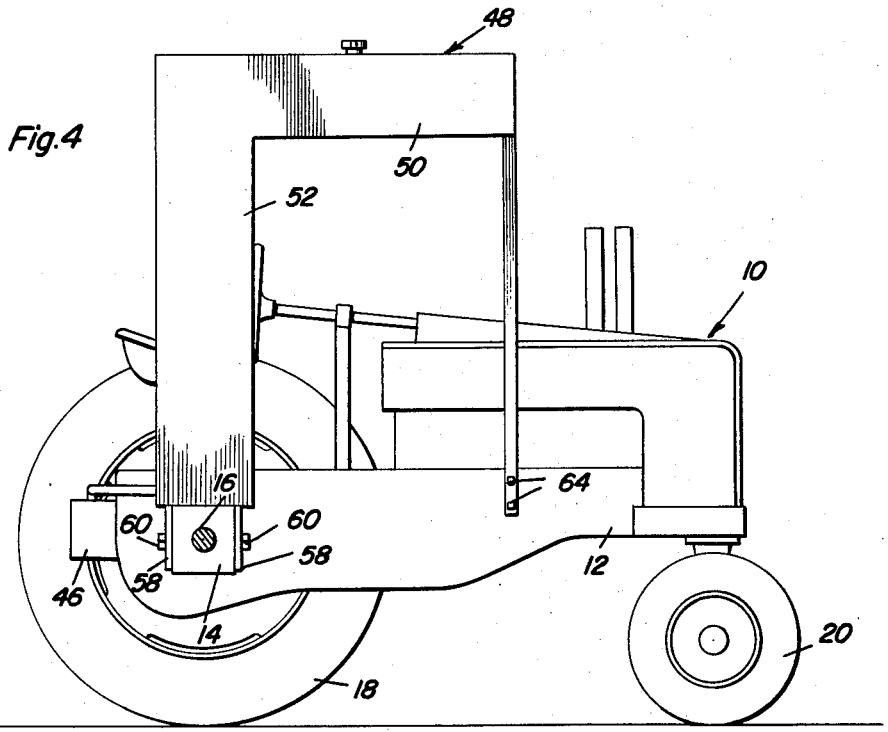
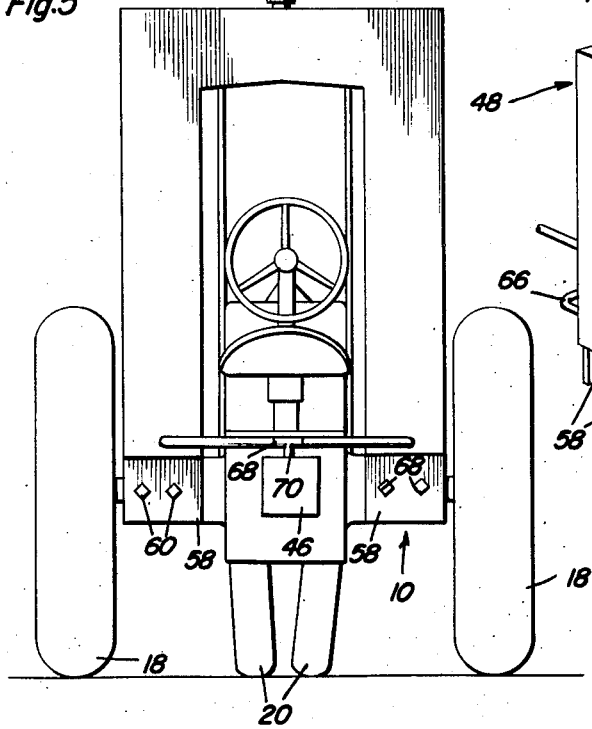
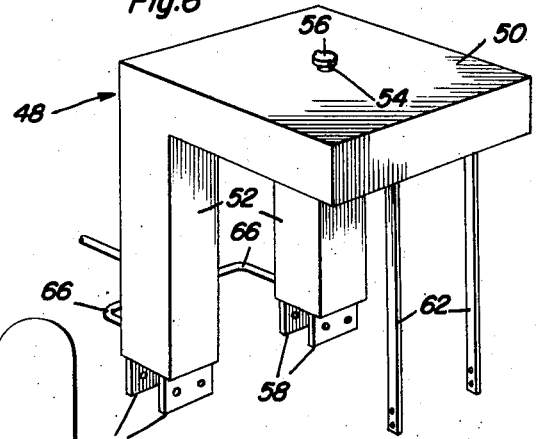
Charlie E. Foster
INVENTOR.

United States Patent Office 2,946,598
Patented July 26, 1960

2,946,598

TRACTOR WITH FENDER AND CAB DEFINING TANKS

Charlie E. Foster, Dilley, Tex.
(Rte. 2, Box 123S, Mission, Tex.)

Filed Oct. 1, 1958, Ser. No. 764,630

5 Claims. (Cl. 280—5)

This invention relates in general to new and useful improvements in accessories for farm tractors, and more specifically to an improved tank construction for a farm tractor.

At the present time in order to increase the traction of the rear driving wheels of a tractor, the large tires of the tractor are filled with a liquid. This increases the weight of the tires and thus increases the load placed by the tires on the ground to result in an increase traction. However, this liquid is carried around for no other purpose than to increase the weight of the rear wheels of the tractor. On the other hand, there are many instances where a tractor is not used for the purpose of towing a heavy load where the traction is required, but is used for spraying purposes. While the storage space for the liquid is available in the tires of a tractor, no facilities have been made for the use of such a liquid. Furthermore, if the liquid were pumped from the tractor tires, then the tractor tires would become deflated.

It is therefore the primary object of this invention to provide accessories for a tractor in the form of tanks which also function as body parts, the tanks holding the desired liquid for spraying purposes and at the same time being positioned so that the weight of the accessories contained therein will be transferred to the rear wheels of the tractor to increase the friction thereof.

Another object of this invention is to provide an improved fender construction for a farm tractor and the like, the fender construction being in the form of tanks which are secured to the rear axle housing of the tractor adjacent the rear driving wheels thereof whereby the combined weight of the fenders and the liquid carried therein will be transferred to the rear driving wheels of the tractor in order to increase the traction thereof and at the same time the liquid contained within the fenders will be available to be sprayed, etc.

Still another object of this invention is to provide an improved cab construction for farm tractors and the like, the cab construction including a roof and side supports, the roof and side supports being hollow and communicated whereby the liquid may be passed into the cab through a filler opening in the top of the roof and which liquid will fill both the side supports and the roof, the side supports being so connected to the frame of the tractor whereby the major portion of the weight of the cab and the liquid contained therein will be transferred to the rear driving wheels of the tractor in order to increase the traction thereof.

A further object of this invention is to provide an improved storage tank assembly for farm tractors and the like, the storage tank assembly being in the form of accessories for the tractor, the accessories being preferably in the form of body parts, such as fenders or a cab and being hollow, the accessories being so positioned on the frame of the tractor whereby the weight thereof and the weight of the liquid contained therein will be transferred to the rear wheels of the tractor to increase the traction thereof and at the same time the accessories are connected to the pump of the tractor whereby the liquid contained therein may be pumped by such pump and sprayed as is desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of a farm tractor which has mounted thereon hollow fenders in accordance with the present invention, the fenders being interconnected for delivering the liquid contained therein to a pump of the tractor;

Figure 2 is a side elevational view of the tractor of Figure 1 with the right rear wheel thereof removed and shows further the relationship of the fender with respect to the remainder of the tractor;

Figure 3 is a perspective view of the left hand fender as it would appear removed from the tractor and shows the specific construction thereof;

Figure 4 is a side elevational view of the farm tractor of Figure 1 with there being mounted thereon in lieu of the fenders a cab, the cab being of a hollow construction and in the form of a tank;

Figure 5 is a rear elevational view of the tractor of Figure 4 and shows further the construction of the cab including the arrangement of the side supports with respect to the roof thereof; and Figure 6 is a front perspective view on a reduced scale of the cab as it appears removed from the tractor and shows the specific details of the same.

Referring now to Figures 1 and 2 in particular, it will be seen that there is illustrated a conventional type of farm tractor which is referred to in general by the reference numeral 10. The farm tractor 10 includes a frame 12 to which there is connected rear axle housings 14. Extending through the rear axle housings 14 are rear axles 16 on which there are mounted rear drive wheels 18. Secured to the front part of the frame 12 in supporting relation are front wheels 20. The tractor 10 also has other components which are not specifically described but which are parts of a conventional tractor of the type illustrated.

Mounted on the tractor 10 is a pair of rear fenders in accordance with this invention. Inasmuch as the fenders are intended for the purpose of protecting the driver of the tractor 10, they are disposed inwardly of the rear wheels 18 thereof.

Each of the fenders is referred to in general by the reference numeral 22 and, as is best illustrated in Figure 3, includes sides 24 which are connected together by a bottom wall 26, end walls 28 and an arcuate top wall 30. The fender 22 is hollow and forms a tank.

The upper part of the top wall 30 is provided with a filler 32 which is normally closed by a filler cap 34. Thus the fender 22 may be conveniently filled with the desired liquid, which liquid in most instances will either be water or a liquid to be sprayed. Secured to the lower rear portion of the fender 22 is a delivery line 36 for supplying liquid from the interior of the fender 22.

The fender 22 is mounted on the rear axle housing 14 adjacent its respective rear driving wheel 18 by means of a pair of mounting plates 38. The mounting plates 38 are centrally located and are secured to the bottom wall 26. The mounting plates, as illustrated in Figure 2, are disposed on opposite sides of the rear axle housing 14 and are secured thereto by means of bolts 40.

The delivery tubes 36 of the two fenders 22 are connected together by means of a T-fitting 42. The T-fitting 42 also connects the delivery hoses 36 to a supply hose 44 for a tractor mounted pump 46 which is mounted on the rear part of the frame 12 of the tractor 10.

No particular spraying equipment has been illustrated inasmuch as it forms no part of the present invention. The spraying equipmnet may be mounted on the tractor 10 in any desired manner and may be of any desired type. For the purpose of this invention it is to be understood that the fenders 22 provide the necessary tanks for storing the liquid to be sprayed and that the tanks are so connected to the tractor mounted pump 46 whereby the liquid is available under pressure for spraying purposes. The spraying liquid may be stored in the fenders 22 for use when desired and at the same time will increase the weight imposed upon the rear wheels 18 so as to increase the traction thereof. If it is not desired to store the spraying liquid within the fenders 22, then when increased weight is required, the fenders 22 may be filled with water. The fenders 22 will each have a capacity of approximately 50 gallons.

Referring now to Figures 4 and 5 in particular, it will be seen that the tractor 10 is illustrated with a different type of accessory mounted thereon. Secured to the tractor 10 is a cab which is constructed in accordance with the present invention. The cab is referred to in general by the refernce numeral 48 and includes a roof tank 50 and a pair of side supports or tanks 52. Both the roof tank 50 and the side supports 52 are hollow and are communicated together. Thus when a liquid is placed into the cab 48 through the filler 54 carried by the upper surface of the roof tank 50, the entire cab will be filled with the liquid. The filler 54 is closed by means of a filler cap 56. It is to be understood that the roof tank 50 and the side supports 52 may be of any desired design. In fact, if desired, the side supports 52 may be in the form of extensions of fenders, such as the fenders 22 and communicated therewith.

In order that the cab 48 may be mounted on the tractor 10, each of the side supports 52 has secured to the underside thereof a pair of depending mounting plates 58 which correspond to the mounting plates 38. The mounting plates 52 straddle the rear axle housing 14, as is best shown in Figure 4, and are secured in place by means of bolts 60.

If it is deemed necessary, the front part of the roof tank 50 may be braced by means of a pair of front supports 62. The front supports 62 will be secured to the forward part of the frame 12 by means of bolts 64. The frame support 62 will be in the form of straps and will not be hollow.

Secured to the lower rear parts of the side supports 52 are delivery lines 66. The delivery lines 66 are connected together by means of the T-fitting 68, illustrated in Figure 5, and to a supply line 70. The supply line 70 is in turn connected to the tractor mounted pump 46 whereby the liquid carried by the cab 48 may be supplied under pressure from the pump 46.

Like the fender 22, the cab 48 is intended to carry a source of a spraying liquid. At the same time, the weight of the cab and the weight of the spraying liquid will be transferred primarily to the rear driving wheels 18 so as to increase the friction thereof.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An accessory for a tractor, said accessory being in the form of a pair of body parts for a tractor, said parts of hollow construction and being liquid tanks, a filler opening in an upper part of said body parts for filling the latter, said body parts including a pair of side tanks each being mounted on a tractor inwardly of and adjacent a rear driving wheel thereof, each tank comprising at least a partial shield or fender to protect a driver from the rear wheels, a delivery line connected to and in communication with the lower portions of each of said tanks, and a supply line having one end in communication with said delivery line and the other end adapted to be operatively connected to a fluid pump on a tractor, a roof tank secured between the upper limits of said side tanks, said filler opening being formed in the upper wall of said roof tank whereby both side tanks may be conveniently filled through one opening.

2. The combination of claim 1 including a pair of elongated rigid supports, one end of each secured to said roof tank and the other ends adapted to be secured to the tractor.

3. The combination of claim 2 wherein said side tanks extend upwardly from said wheels and support said roof tank above the tractor a sufficient amount to enable a driver to set therebeneath and thus be protected from the elements.

4. An accessory for a tractor, said accessory comprising a cab including a roof and side supports, said roof and side supports being hollow and in communication for the storage of liquids, a filling opening in the upper part of said roof, and a delivery attachment connected to the lower part of each of said side supports for delivering liquid contained therein to a tractor mounted pump.

5. An accessory for a tractor, said accessory comprising a cab including a roof and side supports, said roof and side supports being hollow and in communication for the storage of liquids, a filling opening in the upper part of said roof, and a delivery attachment connected to the lower part of each of said side supports for delivering liquid contained therein to a tractor mounted pump, said cab being mounted on a tractor adjacent the rear driving wheels thereof whereby the weight of said cab and the liquid disposed therein will be transferred to the rear driving wheels to increase the traction thereof.

References Cited in the file of this patent

"Farm Implement and Machinery Review" magazine; published, March 1, 1949; page 1185.